Patented Feb. 27, 1940

2,192,015

UNITED STATES PATENT OFFICE 2,192,015

POLYMERIZATION AND CONDENSATION PROCESS CATALYZED BY MEANS OF DIHYDROXYFLUOBORIC ACID AND DIHYDROXYFLUOBORIC ACID-BORON FLUORIDE ADDITION COMPOUNDS

Julius A. Nieuwland, deceased, late of Notre Dame, Ind., by James A. Burns, executor, Notre Dame, Ind., and Frank J. Sowa, South Bend, Ind., assignors to E. I. du Pont de Nemours & Company, Wilmington, Del., a corporation of Delaware No Drawing. Application April 21, 1937, Serial No. 138,187

12 Claims. (Cl. 260—497)

This invention relates to a new method of catalysis in polymerization and condensation reactions of organic compounds, and more particularly to methods wherein new derivatives of boron fluoride act as catalysts in organic polymerization and condensation reactions. Still more particularly it is related to an improved method of using new derivatives of boron fluoride as catalysts in polymerization and condensation reactions of olefines and acetylenes.

This application is a continuation in part of applicants' copending application Serial No. 747,892, filed October 11, 1934, which application has now matured into U. S. Patent No. 2,109,340, issued February 22, 1938.

The use of boron fluoride for catalytic reactions of acetylene and olefines has been described by numerous authors, among them particularly are Nieuwland and co-workers (U. S. Patent 1,907,560; J. Amer. Chem. Soc. 54, 2019; 54, 3694; 55, 2857; 55, 3402); Fritz Hofmann and Carl Wulff assignors to I. G. Farbenind. Akt.-G. (U. S. 1,898,627); Hoffman and Michael Otto, assignors to I. G. Farb. Akt. (U. S. 1,885,060 and 1,811,130) and Walter Weibezahn to I. G. Farb. Akt.-G. (U. S. 1,912,608). In general, these disclosures follow the practice of adding boron trifluoride to the reaction mass, though the conditions are generally such that fluoboric acids are formed in the reaction mixture, and in patents granted to Nieuwland, the direct use of fluoboric acids is mentioned.

Boron fluoride is a corrosive gas of low boiling point which is difficult to prepare and handle. Further, it is a highly active polymerizing agent and in some cases with oxygen-containing organic compounds, its use results in charring.

This invention has as an object a method of catalysis in organic polymerization and condensation reactions wherein new and improved catalysts are employed. Another object is a method of catalysis in organic polymerization and condensation reactions of the type previously catalyzed by boron fluoride wherein a catalyst which is more accurately quantitively measured than heretofore is employed. Another object is a method of catalysis in organic polymerization and condensation reactions of the type previously catalyzed by boron fluoride wherein a catalyst which may be supplied to the reaction mass more conveniently than has hitherto been possible is employed. A further object is a method of catalysis in organic polymerization and condensation reactions of the type previously catalyzed by boron fluoride wherein a new catalyst is used, the vigor of which as a catalyst and as a charring agent may be moderated and controlled.

Other objects will appear hereinafter.

The objects of this invention are accomplished by using as a catalyst in organic polymerization and condensation reactions a compound of boron fluoride, which we have named dihydroxyfluoboric acid, and related complex compounds consisting of addition compounds of dihydroxyfluoboric acid with boron fluoride.

Dihydroxyfluoboric acid, believed to be

may be prepared by two types of reactions. First it may be prepared by the reaction of boron fluoride upon solid boric acid, $H_3BO_3$. The reaction is believed to be:

A second method, which is more satisfactory, is accomplished by passing anhydrous hydrofluoric acid into boric oxide and heating to drive off $BF_3$. The reaction is believed to be:

Dihydroxyfluoboric acid prepared by the above methods is a syrupy liquid analyzing to correspond to the formula $H_3BO_2F_2$, or if preferred, $HBO_2.2HF$. The molecular weight by vapor density measurement indicates dissociation in the vapor state into two molecules, giving a figure of approximately 41.9 instead of 83.8 as calculated from the above formulae. Dihydroxyfluoboric acid distills at 159 to 160° C. and has a boiling point of 159.1° C. at 744 mm. and 69° C. at 4 mm.; its specific gravity has been found to be 1.6569 at 25° C. and 1.5639 at 30° C. The conductivity of the pure product is comparable to concentrated sulfuric acid. It has been found to be soluble in acetic acid, aniline and phenol; it is insoluble in carbon tetrachloride, carbon bisulfide and benzene. The new acid reacts normally with metals, liberating hydrogen with Na, Ca, Mg, Zn etc.; it is decomposed by water giving a solid compound which when washed with ether and dried proves to be metaboric acid.

Dihydroxyfluoboric acid absorbs up to one mol of $BF_3$ for each mol of pure acid and retains it unless heated to a temperature somewhat below the boiling point of dihydroxyfluoroboric acid. Because of this characteristic of the acid, the second reaction above given will actually result in a mixture of the acid and its addition product, probably according to the following equation:

$$9H_2F_2 + 4B_2O_3 \rightarrow 4H_3BO_2F_2 + 2H_3BO_2F_2.BF_3$$

provided the reaction mixture is not heated above the decomposition temperature of the addition product.

Dihydroxyfluoboric acid and dihydroxyfluoboric acid-boron fluoride addition product and the process of preparing them are not claimed in this application but are claimed in applicant's copending application Serial No. 747,892, filed October 11, 1934, to which case reference is here made for a more complete disclosure of the preparation of the compounds.

Both the acid and its addition product may be used, per se, as catalysts in place of boron fluoride with excellent results, and such catalytic action takes place without subjecting the acid or its addition product to heat and the action of sulfuric acid, or either, to release boron fluoride. Moreover, a mixture of dihydroxyfluoboric acid and its boron fluoride addition product, in any proportions, may be used as a catalyst instead of the acid per se. It is, therefore, possible and economical to use the mixed product of the reaction between anhydrous hydrofluoric acid and boric oxide without further processing to isolate dihydroxyfluoboric acid per se. The mixture may be used in the proportions of the acid and its addition product as they exist at the end of the stated reaction. Furthermore, other proportions may be used without materially modifying the catalytic efficiency of the mixture. Dihydroxyfluoboric acid is a general reagent capable of replacing boron fluoride in all of its reactions to the best of our knowledge. Thus, it has been found useful to catalyze the addition of acetylene to organic acids to form vinyl esters, and the addition of olefins to organic acid to form saturated esters; it will catalyze the addition of acetylene to alcohols to form vinyl ethers and acetals. In its use as an acetylene catalyst, in general, it is used in conjunction with mercury salts in the same manner as is well known in the art wtih sulfuric acid and boron fluoride. Dihydroxyfluoboric acid is capable of bringing about the addition of olefins to phenols to form alkyl phenol ethers, and rearranging these ethers to the corresponding C-alkyl phenols. Esters are obtained from aromatic acids and olefins, and alkylated esters from aromatic hydroxy acids such as salicyclic acid. This new acid will catalyze the esterification of carboxylic acids with alcohols in the manner of other strong acids such as sulfuric acid. It will bring about the polymerization of olefins especially under the influence of pressure and temperature. Upon reacting acetylene with phenols in the presence of dihydroxyfluoboric acid, resinous products frequently result, but it is believed that in these cases, vinyl ethers and vinyl phenols are intermediates, and in some cases, products with boiling ranges corresponding to the monomers have been isolated. The condensation of alkines with olefins is also catalyzed by dihydroxyfluoboric acid, although here too, resinous products are often obtained. In general, this new catalytic material is applicable to reactions of alkines with compounds containing the —OH group, whereby we mean the —OH group when attached to carbon as in phenols, alcohols, glycols, aromatic alcohols, and carboxylic acids, these reactions generally being further catalyzed by the addition of mercury salts. It is applicable to reactions of olefins wherein the groups above mentioned with alkines are concerned, and also for the polymerization reactions wherein olefins react with themselves, or like compounds in mixtures. Dihydroxyfluoboric acid boron fluoride addition product may be used in place of the acid in the reaction described above. The following reactions are a few chosen at random.

It is to be understood that the following examples are merely by way of illustration and that wide variations are possible in these reactions and the catalysts may be used in other reactions as set forth above.

Example 1

Two parts by weight of dihydroxyfluoboric acid was added to a mixture of 60 parts of acetic acid and 46 parts of ethanol. The mixture was refluxed for 1 hour and then distilled giving 42 parts of ethyl acetate. Similar quantities of acetic acid and ethanol were again added to the residue from the distillation and the refluxing repeated giving a similar quantity of ethyl acetate. After eight repeated esterifications carried out in this manner, the dihydroxyfluoboric acid was recovered from the residue by distillation for future use.

A longer period of refluxing, for example 5 to 6 hours, will give a higher conversion to ester, for example 50 to 60 parts by weight.

In a similar manner, this process can be applied to the preparation of methyl and isopropyl acetates, methyl benzoate and methyl anthranilate.

Example 2

One mol of acetic acid and 2 grams of dihydroxyfluoboric acid were weighed into an absorption flask which is swept and placed under a slight pressure of butylene. The flask was shaken and maintained at 25–30° C. until 10 grams of butylene were absorbed. The contents were neutralized with $Na_2CO_3$, dried over calcium chloride and distilled, fractionating out 16 grams of tertiary butyl acetate.

The use of higher pressures with agitation favors the formation of higher yields of ester. This process may be applied to the esterification of acetic acid with butylene, propylene, amylene, vinyl chloride, etc.

Example 3

Seventy grams of isopropyl phenyl ether was refluxed with 5 grams of dihydroxyfluoboric acid for 1 hour. Following the usual method of separation, 60 g. of 2- and 4-isopropyl-phenol were obtained.

Example 4

Ninety-four grams of phenol and 5 grams of dihydroxyfluoboric acid were agitated under an atmosphere of propylene at 30–35° C. When 25 grams of propylene had been absorbed, the mixture was treated according to the usual procedure and 45 grams of isopropyl phenols were isolated together with a small amount of isopropyl phenyl ether.

Example 5

One mol of dry benzene and 2 grams of dihydroxyfluoboric acid were agitated under an atmosphere of butylene until an increase in weight of 32 grams had been observed. Separation of the products gave 18 grams of mono- and 5 grams of di-butylbenzene.

Example 6

One part of mercuric oxide and one part of dihydroxyfluoboric acid were added to 100 parts of acetic acid and vinylacetylene was passed in at 25-30° C. After neutralizing with sodium acetate and fractionating, an 80% yield of methyl vinyl ketone and acetic anhydride was obtained according to the equation:

$$C_4H_4 + 2CH_3COOH \rightarrow CH_3COCH=CH_2 + (CH_3CO)_2O$$

Example 7

10 g. of dihydroxyfluoboric acid were warmed with 2 gms. of HgO until the oxide was partially dissolved. To this was added 200 cc. of the ethyl ether of diethylene glycol, and acetylene was passed in until an increase in weight of 20 gms. was observed, corresponding to the absorption of one-half gram-mol of acetylene per mol of the ether. When the rate of reaction decreased, additional portions of HgO were added (2 gms.) not more than 10-12 gms. being required in all. On the completion of the reaction, the product was neutralized with saturated potassium carbonate solution, separated and dried with anhydrous potassium carbonate then distilled, yielding an acetal, probably $$CH_3CH(OCH_2CH_2OCH_2CH_2OCH_2CH_3)_2$$

boiling at 140-145° C. at 14 mm. pressure.

Example 8

Example 7 was repeated obtaining the same product, but using an equal weight of the boron fluoride addition product of dihydroxyfluoboric acid, $H_3BO_2F_2.BF_3$, as the catalyst.

Example 9

2 gms. of dihydroxyfluoboric acid and 1 gm. of HgO were added to 100 gms. of acetic acid.  The mixture was vigorously stirred while acetylene was passed in until absorption was complete. When the absorption ceased, the mixture was neutralized by stirring with anhydrous sodium acetate and filtering. The product was then isolated by vacuum fractional distillation, giving an excellent yield of vinyl acetate.

Example 10

Example 9 was repeated to obtain the same product using an equal weight of the boron fluoride addition product of dihydroxyfluoboric acid as the catalyst in place of $H_3BO_2F_2$.

Example 11

Example 9 was repeated to obtain the same product using an equal weight of the mixed $H_3BO_2F_2$ and $H_3BO_2F_2.BF_3$ obtained by reacting together anhydrous hydrofluoboric acid and boric oxide.

From the above description and specific examples, it is obvious that dihydroxyfluoboric acid its addition compound with boron fluoride and mixtures of the two compounds may replace boron fluoride in any reaction where the boron fluoride functions as a catalyst. The same conditions of temperature, time of reaction, etc., apply as when boron fluoride itself is used.

Thus methods of organic polymerization and condensation particularly with reference to olefins and acetylenes, wherein boron fluoride has been the prior art catalyst, have been improved by employing new catalysts which permit greater ease in handling and in measuring the amount of catalyst introduced into the mass. These methods have been further improved by a decrease in charring and greater ease in control of the catalytic action. Moreover, the new compounds are readily prepared.

It is apparent that many widely different embodiments of this invention may be made without departure from the spirit and scope thereof, and therefore it is not intended to be limited except as indicated in the appended claims.

We claim:

1. A process which comprises reacting, in the presence of a member of the group consisting of dihydroxyfluoboric acid, dihydroxyfluoboric acid-boron fluoride addition compound and a mixture of the two compounds, an organic compound having an unsaturated carbon to carbon linkage with a member of the group consisting of olefins and compounds having the characteristic group C—OH in which the carbon attached to the hydroxyl radical is, in turn, linked by its remaining valences only to elements of the group consisting of carbon, hydrogen and oxygen.

2. In the polymerization and condensation of organic compounds, the step of catalyzing, with a member of the group consisting of dihydroxyfluoboric acid, dihydroxyfluoboric acid-boron fluoride addition compound and a mixture of the two compounds, reactions of organic compounds having an unsaturated carbon to carbon linkage with members of the group consisting of olefins and compounds having the characteristic group C—OH in which the carbon attached to the hydroxyl radical is, in turn, linked by its remaining valences only to elements of the group consisting of carbon, hydrogen and oxygen, which reactions can be catalytically aided by the presence of boron fluoride.

3. The process which comprises reacting, in the presence of a member of the group consisting of dihydroxyfluoboric acid, dihydroxyfluoboric acid-boron fluoride addition compound and a mixture of the two compounds, an alkine with a member of the group consisting of olefins and compounds having the characteristic group C—OH, in which the carbon attached to the hydroxyl radical is, in turn, linked by its remaining valences only to elements of the group consisting of carbon, hydrogen and oxygen.

4. In the polymerization and condensation of organic compounds, the step of catalyzing, with a member of the group consisting of dihydroxyfluoboric acid, dihydroxyfluoboric acid-boron fluoride addition compound and a mixture of the two compounds, reactions of alkines with members of the group consisting of olefins and compounds having the characteristic group C—OH in which the carbon attached to the hydroxyl radical is in turn, linked by its remaining valences only to elements of the group consisting of carbon, hydrogen and oxygen, which reaction can be catalytically aided by the presence of boron fluoride.

5. A process which comprises reacting, in the presence of a member of the group consisting of dihydroxyfluoboric acid, dihydroxyfluoboric acid-boron fluoride addition compound and a mixture of the two compounds, an alkine with a carboxylic acid.

6. A process which comprises reacting, in the presence of a member of the group consisting of dihydroxyfluoboric acid, dihydroxyfluoboric acid-boron fluoride addition compound and a mixture of the two compounds, an alkine with an alcohol.

7. A process which comprises reacting, in the presence of a mercury salt and a member of the group consisting of dihydroxyfluoboric acid, dihydroxyfluoboric acid-boron fluoride addition compound and a mixture of the two compounds, an alkine with a member of the group consisting of olefins and compounds having the characteristic group C—OH in which the carbon attached to the hydroxyl radical is, in turn, linked by its remaining valences only to elements of the group consisting of carbon, hydrogen and oxygen, which reaction can be catalytically aided by the presence of boron fluoride.

8. A process which comprises reacting, in the presence of a mercury salt and a member of the group consisting of dihydroxyfluoboric acid, dihydroxyfluoboric acid-boron flouride addition compound and a mixture of the two compounds, an alkine with a carboxylic acid.

9. A process which comprises reacting, in the presence of a mercury salt and a member of the group consisting of dihydroxyfluoboric acid, dihydroxyfluoboric acid-boron flouride addition compound and a mixture of the two compounds, an alkine with an alcohol.

10. A process which comprises reacting, in the presence of a member of the group consisting of dihydroxyfluoboric acid, dihydroxyfluoboric acid-boron fluoride addition compound and a mixture of the two compounds, an olefin with a member of the group consisting of olefins and compounds having the characteristic group C—OH in which the carbon attached to the hydroxyl radical is, in turn, linked by its remaining valences only to elements of the group consisting of carbon, hydrogen and oxygen.

11. In the polymerization and condensation of organic compounds, the step of catalyzing, with a member of the group consisting of dihydroxyfluoboric acid, dihydroxyfluoboric acid-boron fluoride addition compound and a mixture of the two compounds, the reactions of olefins with members of the group consisting of olefins and compounds having the characteristic group C—OH in which the carbon attached to the hydroxyl radical is, in turn, linked by its remaining valences only to elements of the group consisting of carbon, hydrogen and oxygen, which reactions can be catalytically aided by the presence of boron fluoride.

12. A process which comprises reacting, in the presence of a member of the group consisting of dihydroxyfluoboric acid, dihydroxyfluoboric acid-boron fluoride addition compound and a mixture of the two compounds, an olefin with a phenol.

JAMES A. BURNS,
*Executor of the Estate of Julius A. Nieuwland, Deceased.*

FRANK J. SOWA.